(12) United States Patent
Montgomery

(10) Patent No.: US 9,197,618 B2
(45) Date of Patent: Nov. 24, 2015

(54) METHOD AND APPARATUS FOR LOCATION-BASED AUTHORIZATION TO ACCESS ONLINE USER GROUPS

(71) Applicant: NAVTEQ North America, LLC, Chicago, IL (US)

(72) Inventor: Gregory Montgomery, Sugar Hill, GA (US)

(73) Assignee: HERE Global B.V., Veldhoven (NL)

( * ) Notice: Subject to any disclaimer, the term of this patent is extended or adjusted under 35 U.S.C. 154(b) by 94 days.

(21) Appl. No.: 13/731,774

(22) Filed: Dec. 31, 2012

(65) Prior Publication Data
US 2014/0189802 A1    Jul. 3, 2014

(51) Int. Cl.
| | |
|---|---|
| *H04L 9/32* | (2006.01) |
| *H04L 29/06* | (2006.01) |
| *H04W 4/02* | (2009.01) |
| *H04L 29/08* | (2006.01) |
| *H04W 4/08* | (2009.01) |

(52) U.S. Cl.
CPC ............ *H04L 63/08* (2013.01); *H04L 63/083* (2013.01); *H04L 67/18* (2013.01); *H04W 4/021* (2013.01); *H04W 4/08* (2013.01)

(58) Field of Classification Search
CPC . H04L 63/08; H04L 63/0869; H04L 63/0876; H04L 63/10; H04L 63/101; H04L 63/102; H04L 63/104; H04L 63/107; H04L 67/18; H04L 63/083; H04W 4/021; H04W 4/08; G06F 21/31; G06F 21/44; G06F 2221/2111

USPC ............ 380/258; 726/1–10, 26–30; 713/168, 713/192–194

See application file for complete search history.

(56) References Cited

U.S. PATENT DOCUMENTS

| | | | |
|---|---|---|---|
| 6,256,737 B1 * | 7/2001 | Bianco et al. ................. 713/186 |
| 8,060,915 B2 * | 11/2011 | Voice et al. ........................ 726/3 |
| 8,065,713 B1 * | 11/2011 | Vainstein et al. ................. 726/2 |
| 2004/0083394 A1 * | 4/2004 | Brebner et al. ............... 713/202 |
| 2009/0215469 A1 | 8/2009 | Fisher et al. |
| 2010/0036912 A1 | 2/2010 | Rao |
| 2010/0056183 A1 | 3/2010 | Oh |
| 2012/0189140 A1 | 7/2012 | Hughes |
| 2012/0202459 A1 | 8/2012 | Martell et al. |
| 2012/0246244 A1 | 9/2012 | Mallet et al. |
| 2012/0324018 A1 | 12/2012 | Metcalf et al. |

OTHER PUBLICATIONS

M. Gallagher, "Location-based Authorization," Masters Project Plan B, pp. 1-28, Spring 2002, < http://www-users.cs.umn.edu/~shekhar/research/marcus.pdf >.

(Continued)

*Primary Examiner* — Hosuk Song
(74) *Attorney, Agent, or Firm* — Ditthavong & Steiner, P.C.

(57) ABSTRACT

An approach is provided for determining a request from a user for an access to at least one user group. The at least one user group is associated with at least one reference location. Consequently, the point of interest platform determines location information associated with the user and/or the device associated with the user. Subsequently, the point of interest platform causes, at least in part, a granting of the access to the user group if the location information indicates that the user and/or the device associated with the user is within a predetermined proximity of the reference location.

20 Claims, 13 Drawing Sheets

(56) References Cited

OTHER PUBLICATIONS

D. Jaros, et al., "New Location-based Authentication Techniques in the Access Management," Abstract only, Wireless and Mobile Communications (ICWMC), 2010 6th International Conference, Valencia, Spain, on Sep. 20-25, 2010.

International Search Report for related International Application No. PCT/EP2013/076039, mailed Apr. 16, 2014, 3 pages.

Written Opinion for related International Application No. PCT/EP2013/076039, mailed Apr. 16, 2014, 8 pages.

* cited by examiner

METHOD AND APPARATUS FOR LOCATION-BASED AUTHORIZATION TO ACCESS ONLINE USER GROUPS

BACKGROUND

Service providers and device manufacturers (e.g., wireless, cellular, etc.) are continually challenged to deliver value and convenience to consumers by, for example, providing compelling network services. With the expanding use of mobile devices, consumers' demand to have valuable services delivered to these devices has increased. By way of example, many mobile devices are now equipped with global positioning system (GPS) receivers and mapping and/or navigation applications for presenting location-based information. One area of interest has been the development of location-based services to provide authorization methods based on mobile unit locations to access online user groups. Such location based authorizations can be extremely effective, especially in a de-centralized environment wherein the members of online user groups change their locations on a frequent basis, which undermines the ability of the online user groups to restrict access only to the active members because it gives prevalence to the difficulty of tracking their membership status. Unfortunately, device application and/or service providers have no convenient means of providing location information to access online user groups. Accordingly, service providers and device manufacturers face significant technical challenges in providing a location-based service that contemporaneously considers a user's location information to optimize results for authentication during a sign-up process for accessing online user groups.

SOME EXAMPLE EMBODIMENTS

Therefore, there is a need for an approach for determining location information associated with the at least one user and/or at least one device associated with the at least one user, and causing, at least in part, a granting of access to the at least one user group if the location information indicates that the at least one user is within a predetermined proximity of the at least one reference location.

According to one embodiment, a method comprises determining a request from at least one user for an access to at least one user group, wherein the at least one user group is associated with at least one reference location. The method also comprises determining location information associated with the at least one user, at least one device associated with the at least one user, or a combination thereof. The method further comprises causing, at least in part, a granting of the access to the at least one user group if the location information indicates that the at least one user is within a predetermined proximity of the at least one reference location.

According to another embodiment, an apparatus comprises at least one processor, and at least one memory including computer program code for one or more computer programs, the at least one memory and the computer program code configured to, with the at least one processor, cause, at least in part, the apparatus to determine a request from at least one user for an access to at least one user group, wherein the at least one user group is associated with at least one reference location. The apparatus is also caused to determine location information associated with the at least one user, at least one device associated with the at least one user, or a combination thereof. The apparatus further causes, at least in part, a granting of the access to the at least one user group if the location information indicates that the at least one user is within a predetermined proximity of the at least one reference location.

According to another embodiment, a computer-readable storage medium carries one or more sequences of one or more instructions which, when executed by one or more processors, cause, at least in part, an apparatus to determine a request from at least one user for an access to at least one user group, wherein the at least one user group is associated with at least one reference location. The apparatus is also caused to determine location information associated with the at least one user, at least one device associated with the at least one user, or a combination thereof. The apparatus further causes, at least in part, a granting of the access to the at least one user group if the location information indicates that the at least one user is within a predetermined proximity of the at least one reference location.

According to another embodiment, an apparatus comprises means for determining a request from at least one user for an access to at least one user group, wherein the at least one user group is associated with at least one reference location. The apparatus also comprises means for determining location information associated with the at least one user, at least one device associated with the at least one user, or a combination thereof. The apparatus further comprises means for causing, at least in part, a granting of the access to the at least one user group if the location information indicates that the at least one user is within a predetermined proximity of the at least one reference location.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining location information associated with the at least one user and/or at least one device associated with the at least one user, and causing, at least in part, a granting of access to the at least one user group if the location information indicates that the at least one user is within a predetermined proximity of the at least one reference location are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
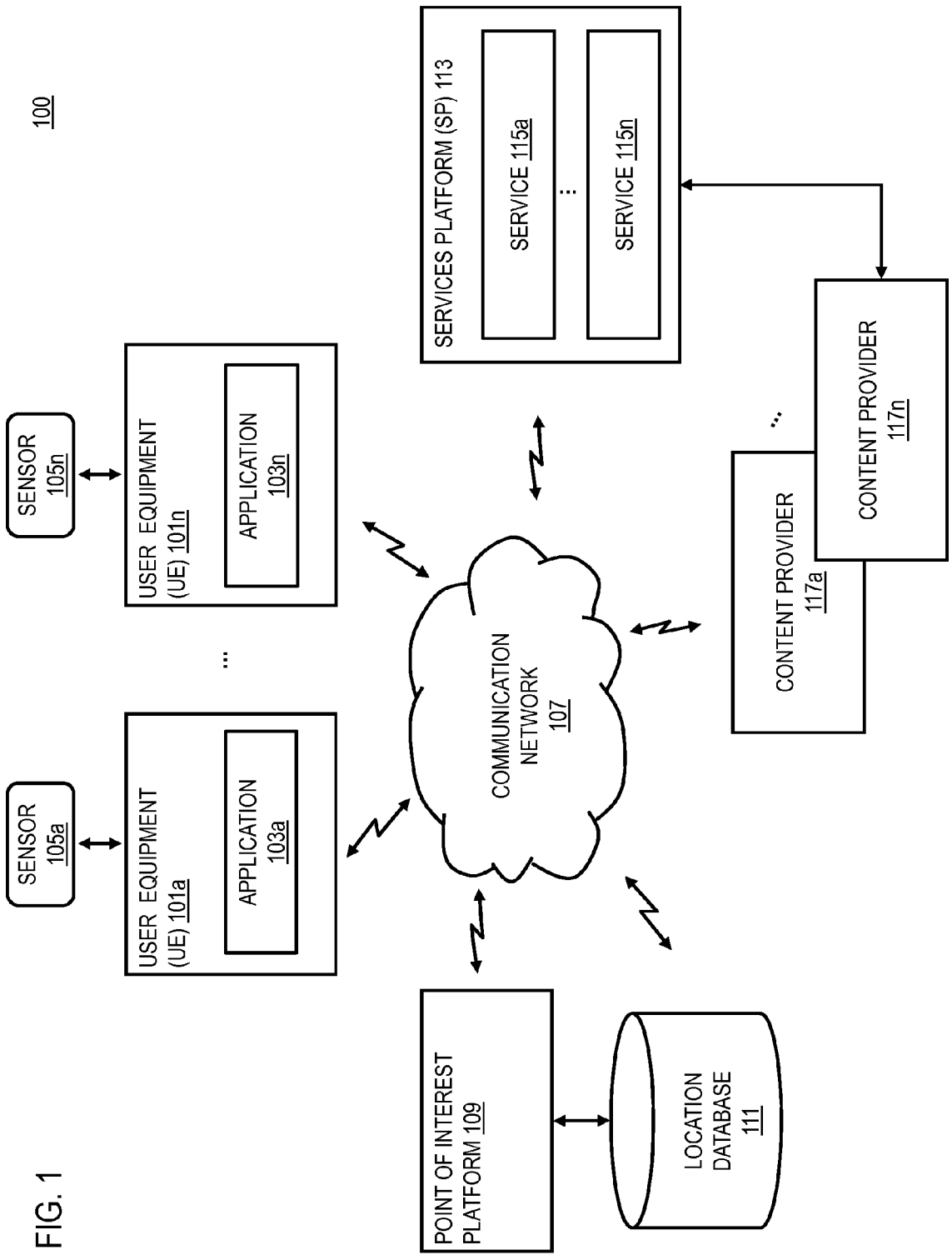
FIG. 1 is a diagram of a system capable of determining location information associated with the at least one user and/or at least one device associated with the at least one user, and causing, at least in part, a granting of access to the at least one user group if the location information indicates that the at least one user is within a predetermined proximity of the at least one reference location, according to one embodiment.

FIG. 1 is a diagram of a system capable of determining location information associated with the at least one user and/or at least one device associated with the at least one user, and causing, at least in part, a granting of access to the at least one user group if the location information indicates that the at least one user is within a predetermined proximity of the at least one reference location, according to one embodiment. As previously discussed, one area of interest among service providers and device manufacturers has been the development of location-based services to provide authorization for access to at least one user group based on mobile unit locations. Since mobile phones have so far emerged as the most personalized and the most reachable communication device, using mobile devices for accessing user groups by using location information enhances user convenience. However, one big challenge with the use of mobile devices for location authentication is that there is currently no convenient means of enabling mobile devices to disseminate and monitor location information for authentication or authorization purposes. As a result, providers of applications and services for device users are limited in their ability to customize features and services that are enhanced by monitoring, retaining and disseminating location information for authentication purposes.

To address this problem, a system 100 of FIG. 1 introduces the capability to determine location information associated with the at least one user and/or at least one device associated with the at least one user, and cause, at least in part, a granting of access to the at least one user group if the location information indicates that the at least one user is within a predetermined proximity of the at least one reference location. By way of example, there are numerous 'semi-private' online groups which are open for qualified members. These online groups may be based on membership of some real-world facility and may want to limit the membership to the real-world participants. This can be very challenging in a de-centralized environment where there are no authoritative way to validate the membership. Further, it may be desirable to only keep the active members as part of the online group. Therefore, proving that users are "active" could be quite difficult and may take a lot of manual effort. In one scenario, if a user group is for the students at a school, one may want to ensure that only current students are part of the group, and constantly updating the group membership and removing former students can be a large administrative burden. In one embodiment, the system 100 determines a request from one or more applications for access to user groups based on location information associated with at least one device. In one example use case, a user may be located afar from the reference location, and may want to use his or her mobile device (e.g., a UE 101) to access a user group. The system 100 may process and/or facilitate a processing of the location information associated with the one or more devices to cause a grant of access if the location information indicates that the user is within a predetermined proximity of the reference location. In one scenario, if the user is not within the predetermined proximity of the reference location within a specific period of time the point of interest platform 109 may optionally cause a revocation of the access.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UEs 101 have connectivity to a point of interest platform 109 via the communication network 107.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as mapping applications, location-based service applications, navigation applications, and/or any other applications that may use POI information including general applications such as media player applications, social networking applications, calendar applications, content provisioning services, and the like. As another example, when the application 103 is a mapping application, it can generate routes, travel destinations or maps based on user inputs. Under this scenario, in addition to generating location information, travel time, etc., the mapping application may provide the duration the at least one user and/or the at least one device is within the predetermined proximity of the at least one reference location. It is noted, in this example, that the profile information enables the mapping application to influence locations and geo-routines by selecting those locations and geo-routines which are found to have attributes aligned with the user's request. In one embodiment, one of the applications 103 at the UE 101 may act as a client for point of interest platform 109 and perform one or more functions associated with the functions of the point of interest platform 109.

By way of example, the sensors 105 may be any type of sensor. In certain embodiments, the sensors 105 may include, for example, a camera/imaging sensor for gathering image data, an audio recorder for gathering audio data, a global positioning sensor for gathering location data, a position sensor or gyroscope for detecting device orientation and/or tilt, a network detection sensor for detecting wireless signals or network data, temporal information and the like. This information is provided to the point of interest platform 109 for processing to determine contextual information associated with UE 101. In certain embodiments, the contextual information may be used in connection with information associated with POIs.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the point of interest platform 109 may be a platform with multiple interconnected components. The point of interest platform 109 may include multiple servers, intelligent networking devices, computing devices, components and corresponding software for performing the function of providing access to the at least one user group if the location information indicates that the at least one user is within a predetermined proximity of the at least one reference location. In addition, it is noted that the point of interest platform 109 may be a separate entity of the system 100, a part of the one or more services 115 of the service platform 113, or included within the UE 101 (e.g., as part of the application 103).

In one embodiment, the point of interest platform 109 performs one or more functions associated with determining a request from a user for an access to a user group. Such request may be approved by the point of interest platform 109 upon a determination that the location information associated with the user and/or the device associated with the user is associated with the reference location. As indicated in the above scenario, a user may want to access a user group. When the user opens the application, his location is known to the server. The user then enters any known information for the online group in his mobile communication device (e.g., UE 101), the mobile communication device then sends a request to the point of interest platform 109 for access to the user group. The point of interest platform 109 then communicates with the geographic database 111, the services platform 113 and the content provider 117 for relevant location information. The point of interest platform 109 may determine one reference location associated with the user group and may process and/or facilitate a processing of the device to determine location information associated with the device. Then, the point of interest platform 109 causes a comparison of the two location information and may grant access if the location information is within the predetermined proximity of the reference location. In one scenario, the point of interest platform 109 may determine that one or more location information corresponding to a user's movement history which may include a portion of King's Street in Alexandria, for example. The point of interest platform 109 can then compare the one or more location information including King's Street against one or more referenced location to determine access to the one or more user group services, one or more service suggestions (e.g., reference location information), or a combination thereof.

In one embodiment, the point of interest platform 109 may monitor the one or more location information continuously, periodically, according to a schedule, on demand, or a combination thereof. For example, if the sensor 105 is "always-on," the point of interest platform 109 may monitor and determine the location information in substantially real time. Consequently, the application 103, for example, may have immediate access to the user's recent movement history, to generate the one or more location information. Accordingly, the point of interest platform 109 may determine to grant access to the user based, at least in part, on such monitoring.

In one embodiment, the point of interest platform 109 determines the duration for a user and/or a device associated with the user within the predetermined proximity of the reference location. The point of interest platform 109 granting access to a user group is further based, at least in part, on the duration. In one scenario, user "Z" may want to access an online user group, such user group may have a requirement that a user should be within the vicinity for 'X' amount of time to access the group, if user 'Z' tries to access the group as soon as he reaches the reference location, he might be prompted that he should try logging-in after 'X' amount of time since there may be a requirement of the length of duration in a single visit. In one scenario, such requirement may not be imposed on users who have visited the referenced location multiple times, and the users may be granted with access to the at least one user groups based, at least in part, on the frequency of their visit.

In one embodiment, the point of interest platform 109 may include or have access to a geographic database 111 to access or store any kind of data associated with POI, such as historical user information, location proximity information, temporal proximity information, contextual proximity information, etc. Data stored in the geographic database 111 may, for instance, be provided by the UEs 101, a service platform 113, one or more services 115a-115n (or services 115), or one or more content providers 117a-117n (or content providers 117). In one embodiment, the geographic database 111 may include an index of various locations. The index is able to be queried by the point of interest platform 109 based on a provided input, such as, from interacting with application 103 via the UE 101. The one or more attributes associated with the location is then maintained by the index.

The services platform 113 may include any type of service. By way of example, the services platform 113 may include mapping services, navigation services, social networking services, content (e.g., text, images, etc.) provisioning services, application services, storage services, contextual information determination services, location based services, information (e.g., weather, news, etc.) based services, etc. In one embodiment, the services platform 113 may interact with the UE 101, the point of interest platform 109 and the content providers 117 to supplement or aid in the processing of the content information.

By way of example, services 115 may be an online service that reflects interests and/or activities of users. In one scenario, the services 115 provide representations of each user (e.g., a profile), his/her social links, and a variety of additional information. The services 115 may optionally allow users to share location information, activities information, contextual information, historical user information and interests within their individual networks, and provides for data portability. The services 115 may additionally assist in providing the point of interest platform 109 with occurrence information of the one or more location information for POIs.

The content providers 117 may provide content to the UE 101, the point of interest platform 109, and the services 115 of the services platform 113. The content provided may be any type of content, such as textual content, image content, etc. In one embodiment, the content providers 117 may provide content that may supplement content of the applications 103, the sensors 105, or a combination thereof. By way of example, the content providers 117 may provide content that may aid in the processing of the location information associated with POIs to determine authentication to a service parameter. In one embodiment, the content providers 117 may also store content associated with the UE 101, the point of interest platform 109, and the services 115 of the services platform 113. In one embodiment, the content providers 117 may manage access to a central repository of data, and offer a consistent, standard interface to data, such as a repository of users' navigational data content. In another embodiment, the content provider 117 act as hosts of one or more websites, social networking services, blogs, advertising materials, review information, data feeds, or sources of other information and/or documents. By way of example, the information and/or published documents provided by the content providers 117 may feature data which may include frequency of visit to POIs, timely verification information with the service providers, default information, if any, associated with POI.

By way of example, the UE 101, the point of interest platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
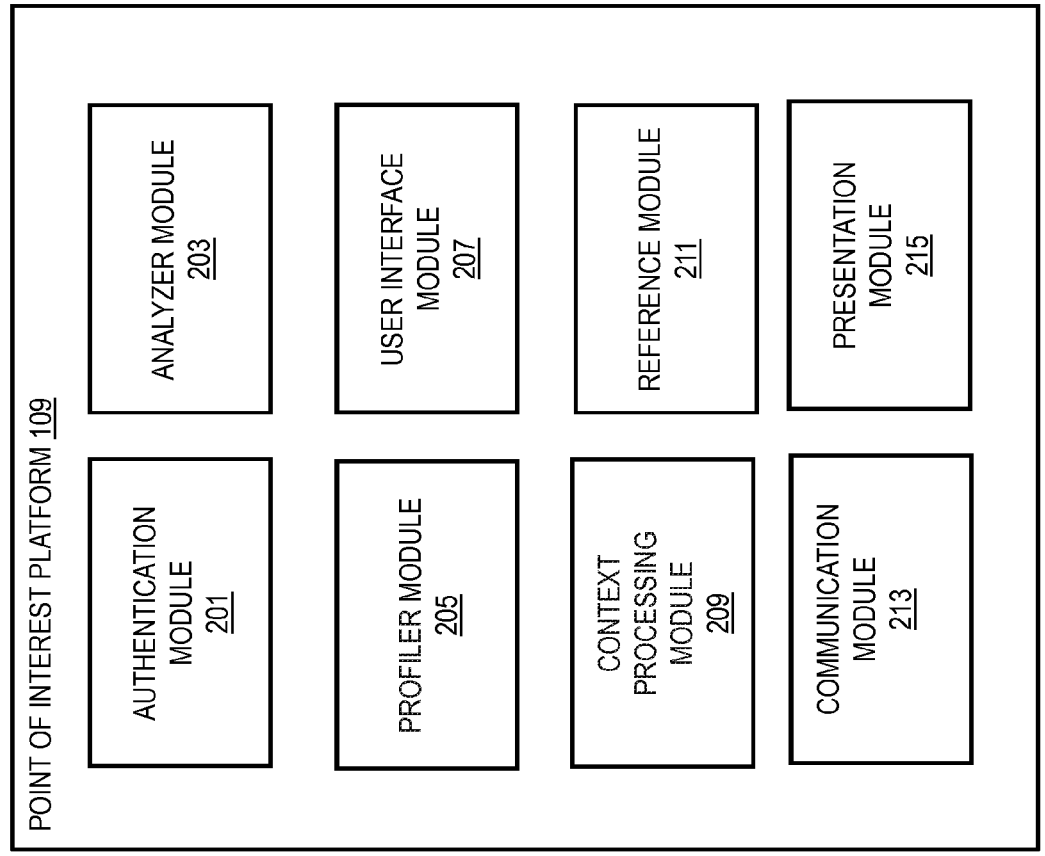
FIG. 2 is a diagram of the components of the point of interest platform 109, according to one embodiment.

FIG. 2 is a diagram of the components of a point of interest platform 109, according to one embodiment. By way of example, the point of interest platform 109 includes one or more components for determining location information associated with the at least one user and/or at least one device associated with the at least one user, and causing, at least in part, a granting of access to the at least one user group if the location information indicates that the at least one user is within a predetermined proximity of the at least one reference location, according to one embodiment. It is contemplated that the functions of these components may be combined in one or more components or performed by other components of equivalent functionality. In this embodiment, the point of interest platform 109 includes an authentication module 201, analyzer module 203, profiler module 205, user interface module 207, context information processing module 209, reference module 211, communication module 213 and presentation module 215.

In one embodiment, an authentication module 201 authenticates users and UE 101 for interaction with the point of interest platform 109. By way of example, the authentication module 201 receives a request to subscribe to the point of interest platform 109 for accessing one user group. The subscription process may include, for example, establishing one or more services the user is affiliated with as well as their respective access credential information. Subscription may also entail selection of an "opt-in" option, wherein users of the point of interest platform 109 permits sharing of their context information (e.g., location information, position information and temporal information) as collected via one or more sensors 105 of UE 101 and/or geographic database 111 and/or services 115. Preferences and settings information may be referenced to a specific user, user device, or combination thereof and maintained in the geographic database 111. It is further noted, in certain embodiments, that the subscription process may be coordinated with a subscription process of a given services 115 accessed by a user.

The authentication process performed by the module 201 may also include receiving and validating a login name and/or user identification value as provided or established for a particular user during a subscription or registration process with the service provider. The login name and/or user identification value may be received as input provided by the user from the user device 101 or other device via a graphical user interface to the point of interest platform 109 (e.g., as enabled by user interface module 207). Profile data pursuant to registration may be cross referenced as part of the login process. Alternatively, the login process may be performed through automated association of profile settings maintained with an IP address, a carrier detection signal of a user device, mobile directory number (MDN), subscriber identity module (SIM) (e.g., of a SIM card), radio frequency identifier (RFID) tag or other identifier.

The authentication module 201 may also be alerted of an input received via the user interface for indicating a user requested action. It is noted that the user interface module 207 supports presentment of the user interface element for presenting such images while the authentication module 201 interprets input provided to the user as they engage the point of interest platform 109. The authentication module 201 is therefore configured to receive requests for generation of a map image via the service or application.

In one embodiment, the analyzer module 203 processes and/or facilitates a processing of the one or more location information associated with a mobile device to determine access to user groups, one or more service suggestions (e.g., a POI), or a combination thereof. By way of example, the analyzer module 203 may determine granting access to user groups based, at least in part, on the reference location contained in the location database 111. The analyzer module 203 may also be used to cause, at least in part, a comparison of the one or more location information against one or more referenced location traces, wherein the one or more user groups, the one or more service suggestions, or a combination thereof are associated with the one or more referenced location.

In one embodiment, the profiler module 205 processes the one or more user devices to determine profile information associated with the at least one user, the at least one device, or a combination thereof. This is done, for example, in response to a request by a calling application and/or service. By way of example, the profiler module 205 cross-references the point of interest platform 109 to determine if at least one of the terms matches that indicated in a user profile. Further, the profiler module 205 may operate in connection with the authentication module 201 to enable updating of the profile information. As such, an application, service, or other executable process of the UE 101 may reference the profiler module 205 for carrying out various tasks.

In one embodiment, the user interface module 207 enables presentment of at least one option to generate the request in a user interface of the at least one client application. By way of example, the user interface module 207 generates the user interface element in response to detection of an input for selection of one user group. Of note, the user interface module 207 triggers execution of the various other modules, including the authentication module 201 in response to user input. The user interface module 207 employs various application programming interfaces (APIs) or other function calls corresponding to the application 103 of UE 101; thus enabling the display of graphics primitives such as menus, buttons, data entry fields, etc., for generating the user interface elements. By way of example, the user interface module 207 generates the interface in response to application programming interfaces (APIs) or other function calls corresponding to the browser application or web portal application of the user devices 101a-101n; thus enabling the display of graphics primitives.

In one embodiment, the context information processing module 209 receives context information as gathered by the sensors 105 of respective UE 101 and/or geographic database 111 and/or services 115. Once received, the context information processing module 209 analyzes the context information to determine the relative location, time, position and other information useful for generating information associated with a specified location. Based on this determination, the context information processing module 209 triggers execution of the communication module 213.

The reference module 211, in certain embodiments, is used to cause, at least in part, a referencing of the one or more location, the one or more user groups, the one or more service suggestions, or a combination thereof on the one or more devices (e.g., the UEs 101), a server (e.g., the point of interest platform 109), or a combination thereof. By way of example, the reference module 211 may reference or map the one or more location to corresponding one or more user groups, one or more service suggestion (e.g., a POI), or a combination thereof in the location database 111 (e.g., "ABC group" is referenced to POI "145").

In one embodiment, a communication module 213 enables formation of a session over a communication network 107 between the point of interest platform 109 and the services 115. By way of example, the communication module 213 executes various protocols and data sharing techniques for enabling collaborative execution between a subscriber's UE 101 and the point of interest platform 109 over the communication network 107.

The presentation module 215 makes a presentation of the at least one client application the user group is associated with, upon receiving the data from communication module 213. The presentation module 215 may utilize the geographic database and/or services 115 to determine whether the information for POI is up to date. This module obtains a set of summary statistics from other modules. Then, the module continues with generating a presentation corresponding to the POI. Then, continues with providing of presentation data set where the presentation could be depicted in one or more visual display units.

The above presented modules and components of the point of interest platform 109 can be implemented in hardware, firmware, software, or a combination thereof. Though depicted as a separate entity in FIG. 1, it is contemplated that the point of interest platform 109 may be implemented for direct operation by respective UE 101. As such, the point of interest platform 109 may generate direct signal inputs by way of the operating system of the UE 101 for interacting with the application 103. In another embodiment, one or more of the modules 201-215 may be implemented for operation by respective UEs, as a point of interest platform 109, or combination thereof. Still further, the point of interest platform 109 may be integrated for direct operation with services 115, such as in the form of a widget or applet, in accordance with an information and/or subscriber sharing arrangement. The various executions presented herein contemplate any and all arrangements and models.

Figure 3:
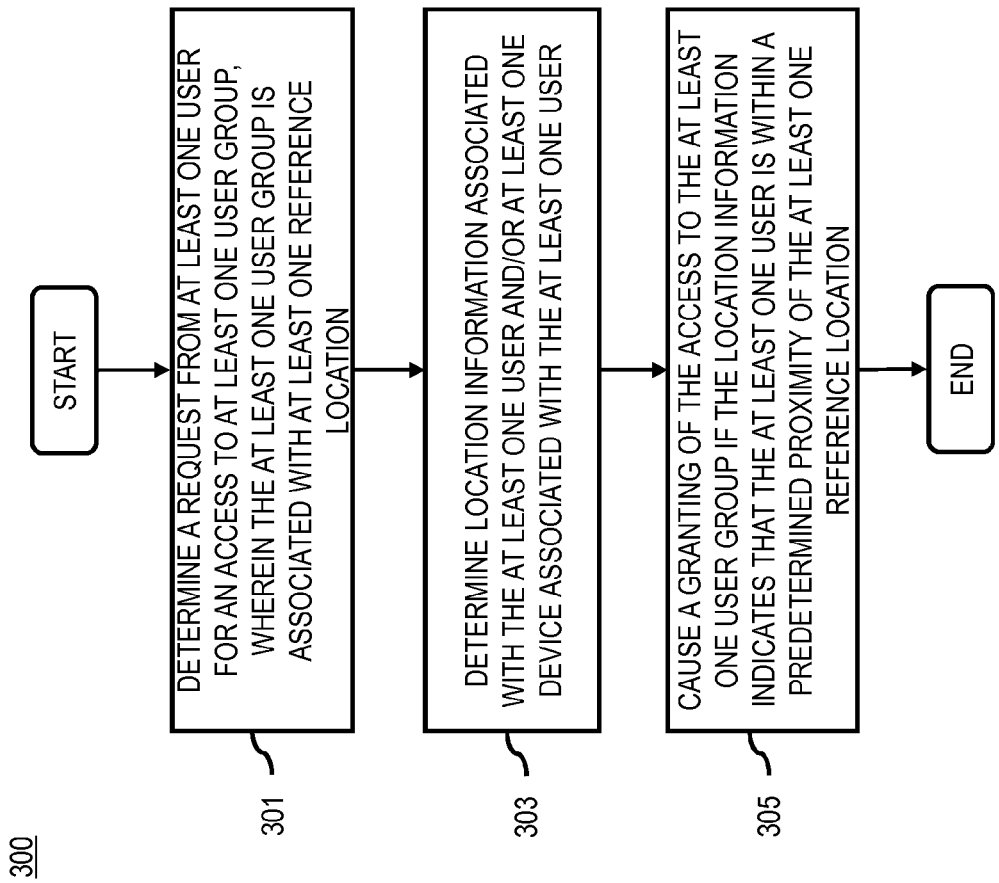
FIG. 3 is a flowchart of a process for determining location information associated with a user and/or at least one device associated with the user, and causing, at least in part, a granting of access to the user group if the location information indicates that the user is within a predetermined proximity of the reference location, according to one embodiment.
Figure 12:
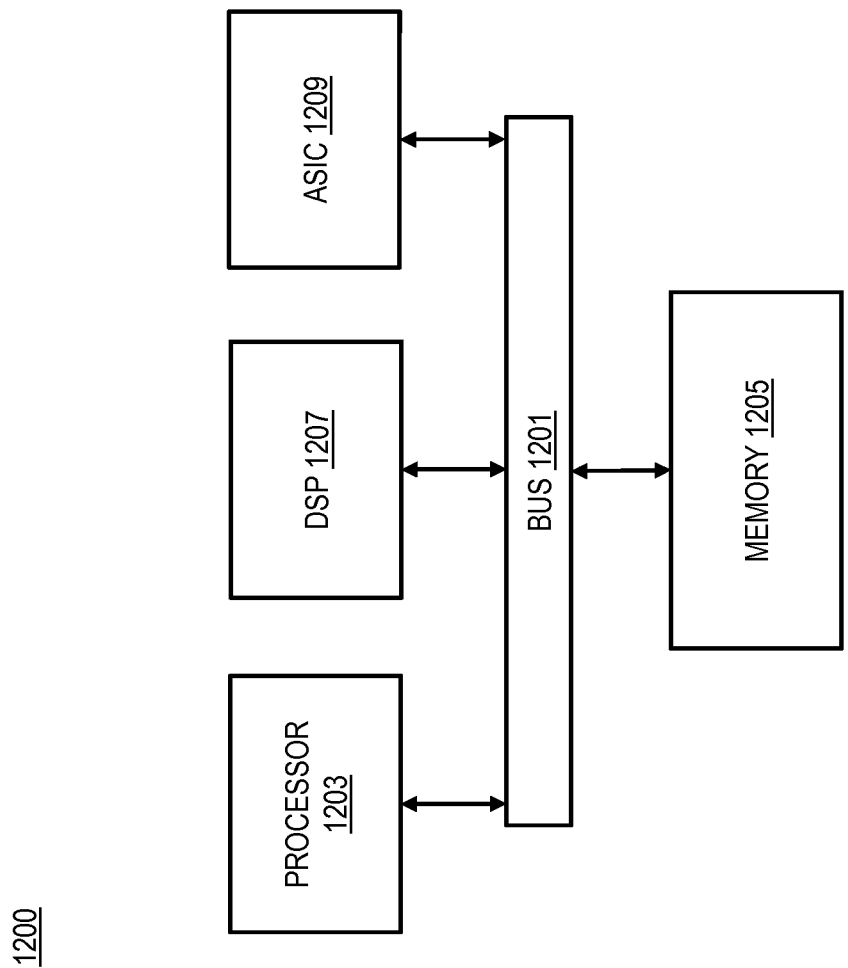
FIG. 12 is a diagram of a chip set that can be used to implement an embodiment of the invention.

FIG. 3 is a flowchart of a process for determining location information associated with a user and/or at least one device associated with the user, and causing, at least in part, a granting of access to the user group if the location information indicates that the user is within a predetermined proximity of the reference location, according to one embodiment. In one embodiment, the point of interest platform 109 performs the process 300 and is implemented in, for instance, a chip set including a processor and a memory as shown in FIG. 12.

In step 301, the point of interest platform 109 determines a request from at least one user for an access to at least one user group, wherein the at least one user group is associated with at least one reference location.

In step 303, the point of interest platform 109 determines location information associated with the at least one user and/or at least one device associated with the at least one user. In one scenario, there may be a 'semi-private' group for parents at a specific school, the parents may have no authoritative way to validate that someone really is a parent because they may not have access to any school-wide student list. Further, it may be desirable to keep only active members as part of the online group. However, proving that users are "active" could be difficult, for instance, in order to ensure that only parents of current students are part of the group, it is a pre-requisite to constantly update the group membership and remove the parents of former students. Henceforth, when a user sends a request to the point of interest platform 109 to access the parent group, the point of interest platform 109 determines a request to access the user group and then retrieves the location information of the UE 101 information to match it with the reference location.

In step 305, the point of interest platform 109 causes, at least in part, a granting of the access to the at least one user group if the location information indicates that the at least one user is within a predetermined proximity of the at least one reference location. Further, the one user group is associated with at least one client application, which causes, at least in part, a presentation of at least one option to generate the request in a user interface of the at least one client application. In the above scenario, when a user sends a request to the point of interest platform 109 to access the parent group, the point of interest platform 109 may grant the user with access to the parent group if the location information of the UE 101 indicates that the user is within a predetermined proximity of the reference location. For instance, if the reference location is "123 XYZ Street", the location information of the device associated with the user should either be "123 XYZ Street" or within the predetermined proximity of "123 XYZ street". In another scenario, the user may be presented with an option to generate a request in the user interface of the client application associated with the user group. For instance, user 'A' uses a gym which has a private group, initially 'A' would need to send a request to join the gym's social group from his mobile device while he was located at the gym. The private group may have an application that could be enhanced to have a 'Authorize my group membership' function, this function may send the location of the mobile device to the point of interest platform 109 and may assist in validating that the user is within a predetermined radius of the group's location. If the user is within this distance, it would serve as an authorization that he really belongs to the gym.

Figure 4:
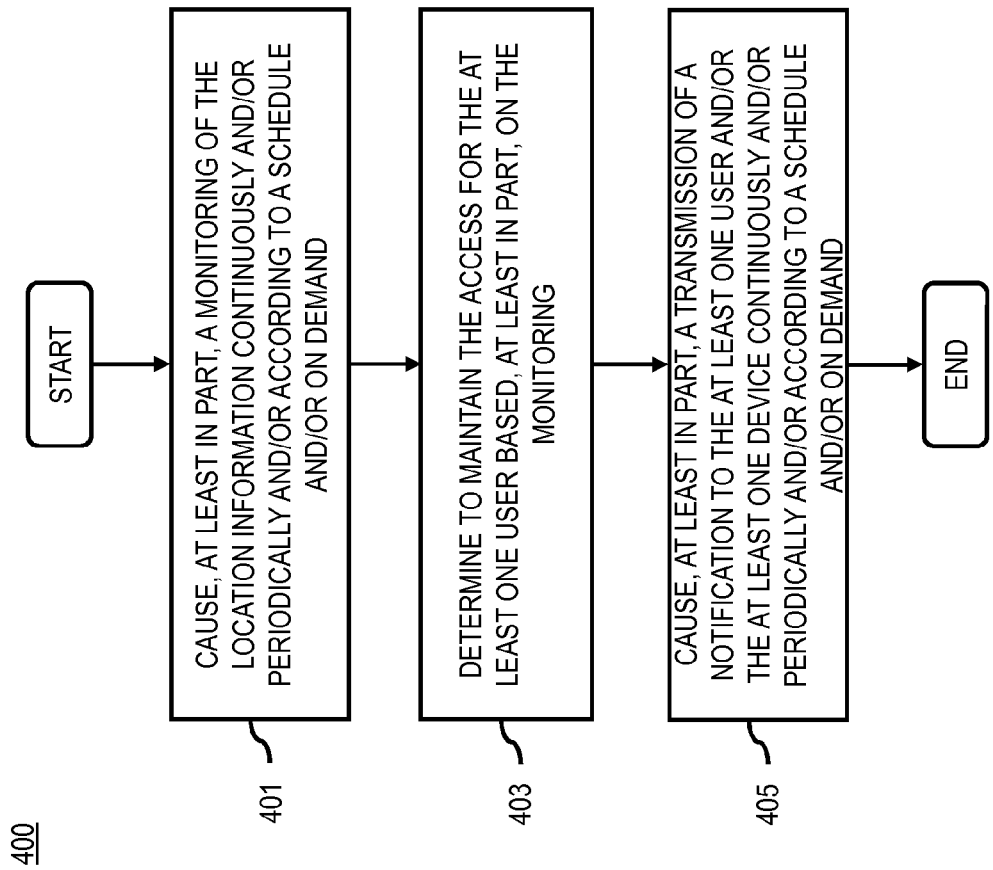
FIG. 4 is a flowchart of a process for causing a monitoring of the location information continuously and/or periodically and/or according to a schedule and/or on demand, in order to cause a determination to maintain the access for a user based, at least in part, on the monitoring, and further provides a process for causing a transmission of a notification to a user and/or the at least one device associated with the user, according to one embodiment.

FIG. 4 is a flowchart of a process for causing a monitoring of the location information continuously and/or periodically and/or according to a schedule and/or on demand, in order to cause a determination to maintain the access for a user based, at least in part, on the monitoring, and further provides a process for causing a transmission of a notification to a user and/or the at least one device associated with the user, according to one embodiment. In one embodiment, the point of interest platform 109 performs the process 400 and is implemented in, for instance, a chip set including a processor and a memory as shown in FIG. 12.

In step 401, the point of interest platform 109 causes, at least in part, a monitoring of the location information continuously, periodically, according to a schedule, on demand, or a combination thereof. Subsequently, the point of interest platform 109 causes an update of the location information for one or more mobile devices based, at least in part, on the monitoring.

In step 403, the point of interest platform 109 determines to maintain the access for the at least one user based, at least in part, on the monitoring. The monitoring of the location information comprises causing, at least in part, a transmission of at least one notification to the at least one user and/or the at least one device continuously, periodically, according to a schedule, on demand, or a combination thereof, wherein the at least notification requests, at least in part, a re-verification of the location information. Further, the re-verification includes, at least in part, a revisiting of a location within the predetermined proximity of the at least one reference location. In one scenario, there can be an enablement of periodic re-authorization of user membership wherein users could be asked to submit their location every 'X' days/weeks/months in order to maintain their group membership. This is particularly useful for groups where the eligible membership changes frequently and the online group administrator desires to keep the group membership limited to only currently eligible users. In one embodiment, the point of interest platform 109 may cause an expiration of the one or more membership for the accessed user groups based, at least in part, on the monitoring.

In step 405, the point of interest platform 109 causes, at least in part, a transmission of at least one notification to the at least one user, the at least one device, or a combination thereof continuously, periodically, according to a schedule, on demand, or a combination thereof, wherein the at least notification requests, at least in part, a re-verification of the location information. A re-verification of the location information may include, at least in part, revisiting of a location within the predetermined proximity of the at least one reference location. In one embodiment, the point of interest platform 109 may process and send notifications to the current users as per schedule and/or on demand that they need to re-verify their location in order to maintain their "active" status. The users may visit the reference location and then access the user groups.

Figure 5:
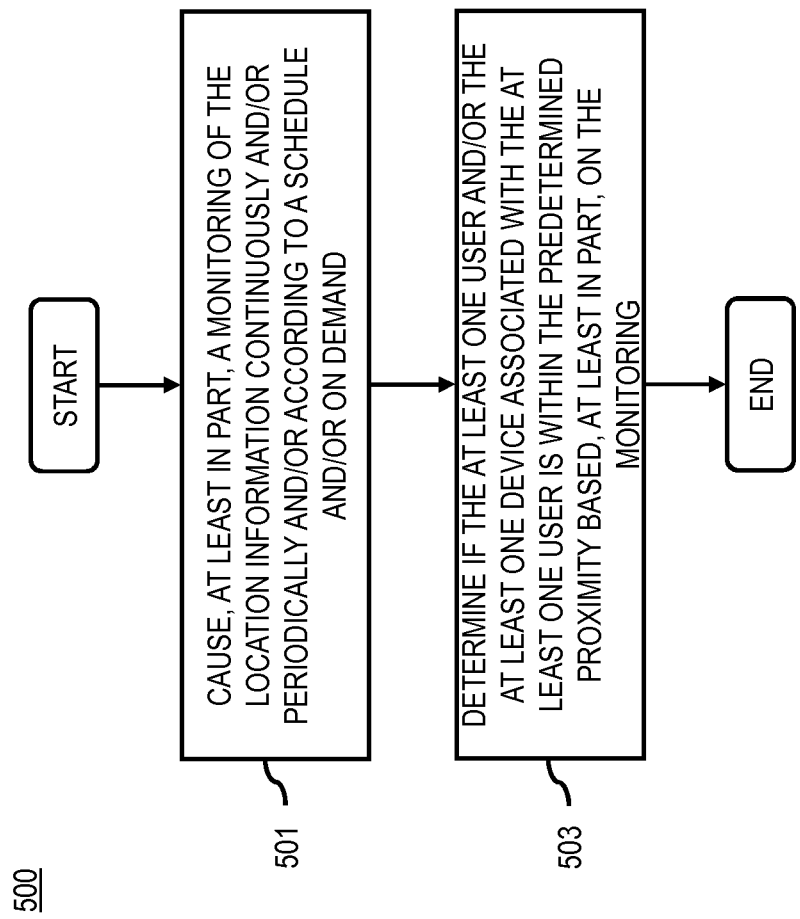
FIG. 5 is a flowchart of a process for causing a monitoring of the location information continuously and/or periodically and/or according to a schedule and/or on demand, in order to determine if the at least one user and/or the at least one device associated with the at least one user is within the predetermined proximity based, at least in part, on the monitoring.

FIG. 5 is a flowchart of a process for causing a monitoring of the location information continuously and/or periodically and/or according to a schedule and/or on demand, in order to determine if the at least one user and/or the at least one device associated with the at least one user is within the predetermined proximity based, at least in part, on the monitoring. In one embodiment, the point of interest platform 109 performs the process 500 and is implemented in, for instance, a chip set including a processor and a memory as shown in FIG. 12.

In step 501, the point of interest platform 109 causes, at least in part, a monitoring of the location information continuously, periodically, according to a schedule, on demand, or a combination thereof. Then, the point of interest platform 109 causes an update of the location information for the one or more mobile devices based, at least in part, on the monitoring.

In step 503, the point of interest platform 109 determines whether the at least one user and/or the at least one device associated with the at least one user is within the predetermined proximity based, at least in part, on the monitoring. In one scenario, the point of interest platform 109 may grant access to the at least one user group if the location information indicates that the at least one user and/or the at least one device associated with the at least one user is within the predetermined proximity of the at least one reference location.

Figure 6:
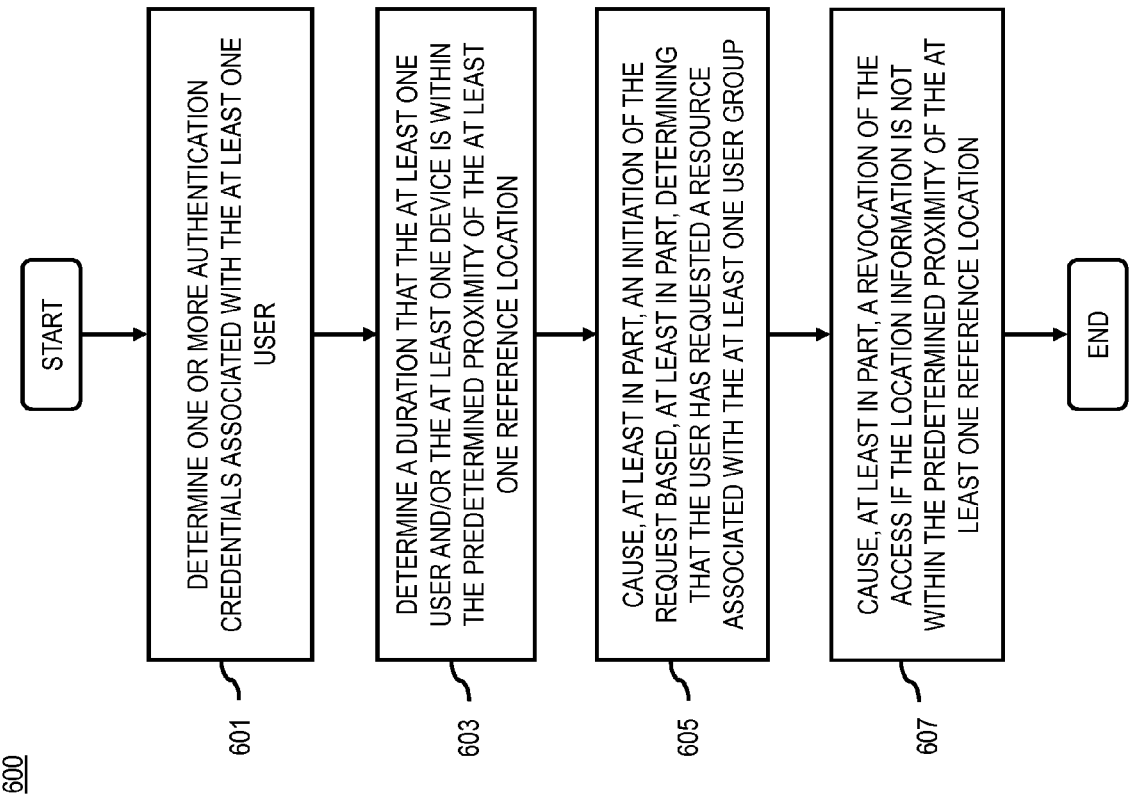
FIG. 6 is a flowchart of a process for determining one or more authentication credentials associated with the at least one user and/or duration that the at least one user and/or the at least one device is within the predetermined proximity of the at least one reference location to cause either an initiation of access or revocation of access, according to one embodiment.

FIG. 6 is a flowchart of a process for determining one or more authentication credentials associated with the at least one user and/or duration that the at least one user and/or the at least one device is within the predetermined proximity of the at least one reference location to cause either an initiation of access or revocation of access, according to one embodiment. In one embodiment, the point of interest platform 109 performs the process 600 and is implemented in, for instance, a chip set including a processor and a memory as shown in FIG. 12.

In step 601, the point of interest platform 109 determines one or more authentication credentials associated with the at least one user, wherein the granting of the access is further based, at least in part, on the one or more authentication credentials. In one scenario, the point of interest platform 109 determines a user by authenticating user credentials associated with the request. The one or more authentication credentials include, at least in part, a username, a password, a user certificate, a token, a web cookie, or a combination thereof.

In step 603, the point of interest platform 109 determines a duration that the at least one user, the at least one device, or a combination thereof is within the predetermined proximity of the at least one reference location, wherein the granting of the access is further based, at least in part, on the duration. In one scenario, the point of interest platform 109 processes and/or facilitates a processing of the at least one device to determine the time period spent in the reference location wherein the determined time period may be compared with the specified time period, if any.

In step 605, the point of interest platform 109 causes, at least in part, an initiation of the request based, at least in part, determining that the user has requested a resource associated with the at least one user group, wherein the resource includes, at least in part, a website. In one scenario, the point of interest platform 109 causes an initiation of validation process for access to the one or more online user groups in response to the request. The user needs to validate their request by being on the reference location. If the user is not within the predetermined proximity of the referenced location then he needs to travel to the referenced location of the user group. The location information is then sent to the website, if it is determined that a user is within the proximity of the referenced location, the user is granted access to the group.

In step 607, the point of interest platform 109 causes, at least in part, a revocation of the access if the location information is not within the predetermined proximity of the at least one reference location. In one scenario, the referenced location for the user group may be '345 ACX street', in order to get access to the user group the user must authenticate that he is within the predetermined proximity of '345 ACX street', if not, his request to access the user group may be refused as he will be deemed a non-member. Then again, this step may be optional, as a user may still maintain access to the at least one user group depending on the specific settings of the user group.

Figure 7:
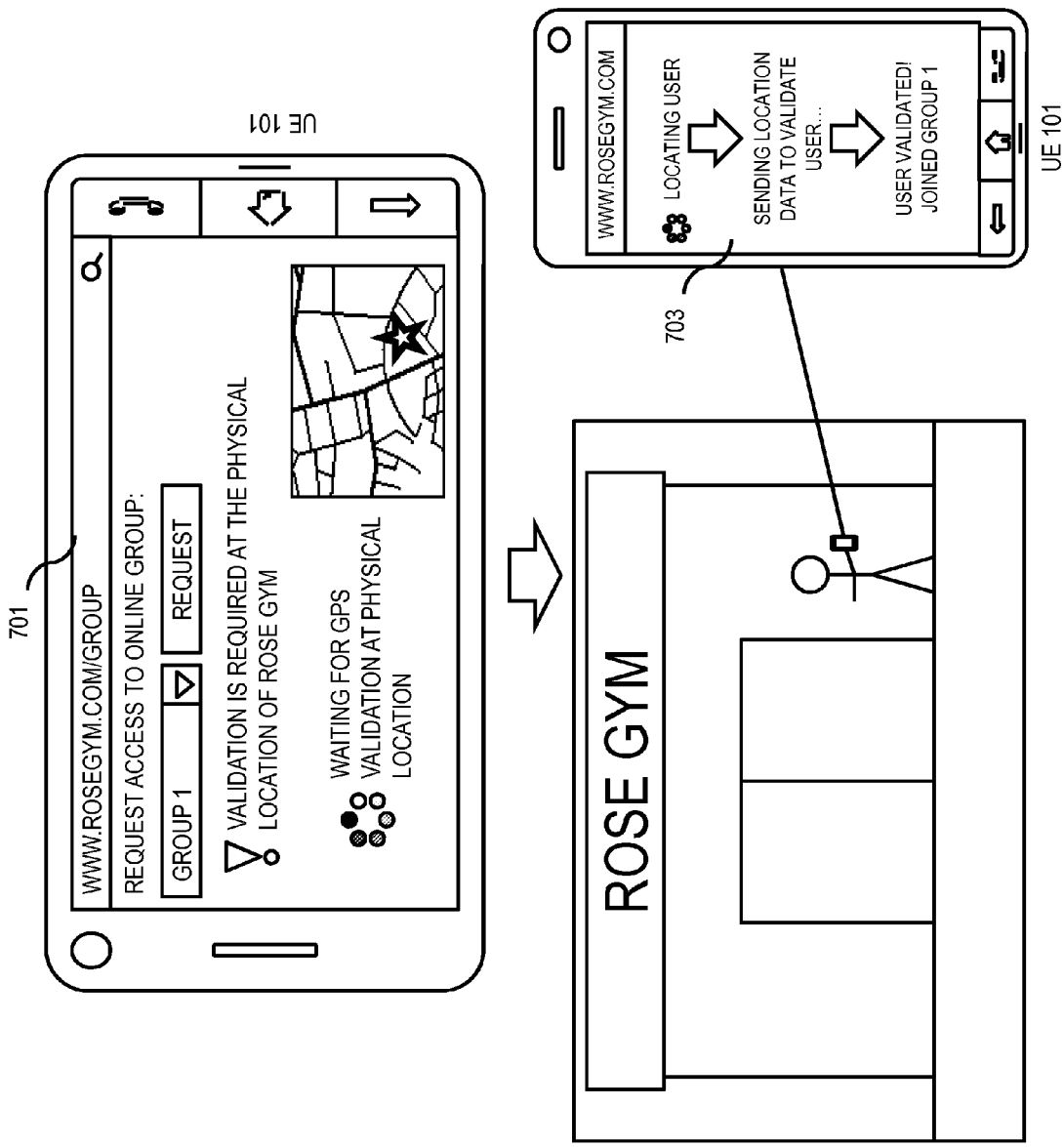
FIG. 7 is a diagram of user interface utilized in the processes of FIGS. 3-6, according to various embodiments.
Figure 9:
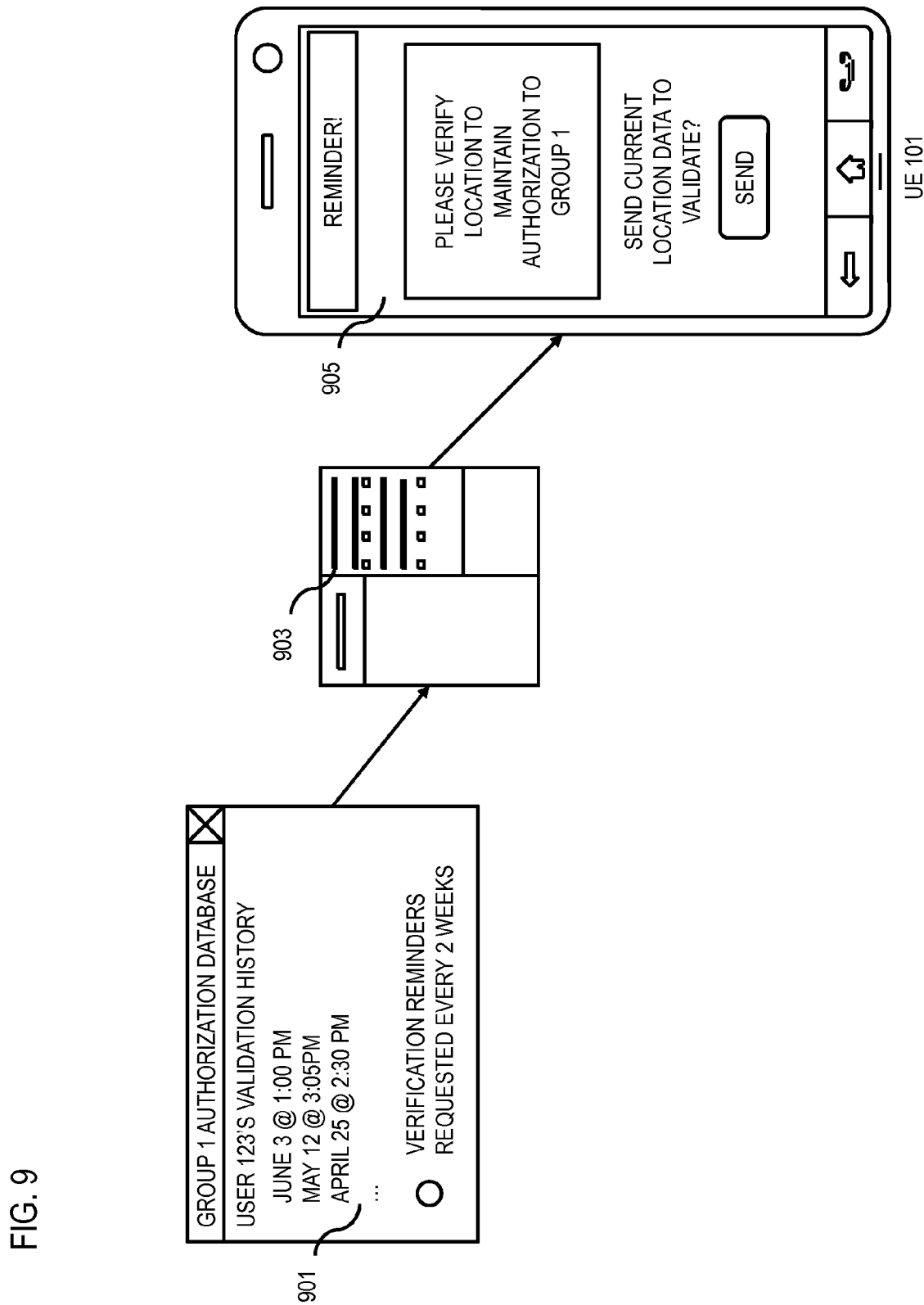
FIG. 9 is a diagram of user interface utilized in the processes of FIGS. 3-6, according to various embodiments.

FIG. 7 is a diagram of user interfaces utilized in the processes of FIGS. 3-6, according to various embodiments. For example, FIG. 9 illustrates a method for determining location information associated with the at least one user and/or at least one device associated with the at least one user, and causing, at least in part, a granting of access to the at least one user group if the location information indicates that the at least one user is within a predetermined proximity of the at least one reference. In one scenario, an online group has a mobile website available. Whenever a user needs to request access to the online group, the user may use his mobile phone (e.g., UE 101 with user interface 701). The UE 101 generates a request for access to user groups and sends the request to the point of interest platform 109. The point of interest platform 109 retrieves the contextual information of the UE 101 from the applications 103, the sensors 105, the geographic database 111, services 115, content provider 117, and processes the contextual information. In one embodiment, the point of interest platform 109 crawls through various systems of the communication network 107 and may gain access to the content information related to the POI. The user may be prompted to validate their request while at the physical location of the group (user interface 701). If the user is within the location proximity, he may be granted access to the user groups, if not, the user needs to travel to the physical location of the group, and then log in to the mobile website using his mobile phone (e.g., UE 101a with user interface 703). The website may use the W3C Geolocation API to request the location of the user. The location is then sent to the website which validates the user is within a predetermined radius of the group's location. Once determined that a user is within this distance, the user is authorized and can immediately join the group.

Figure 8:
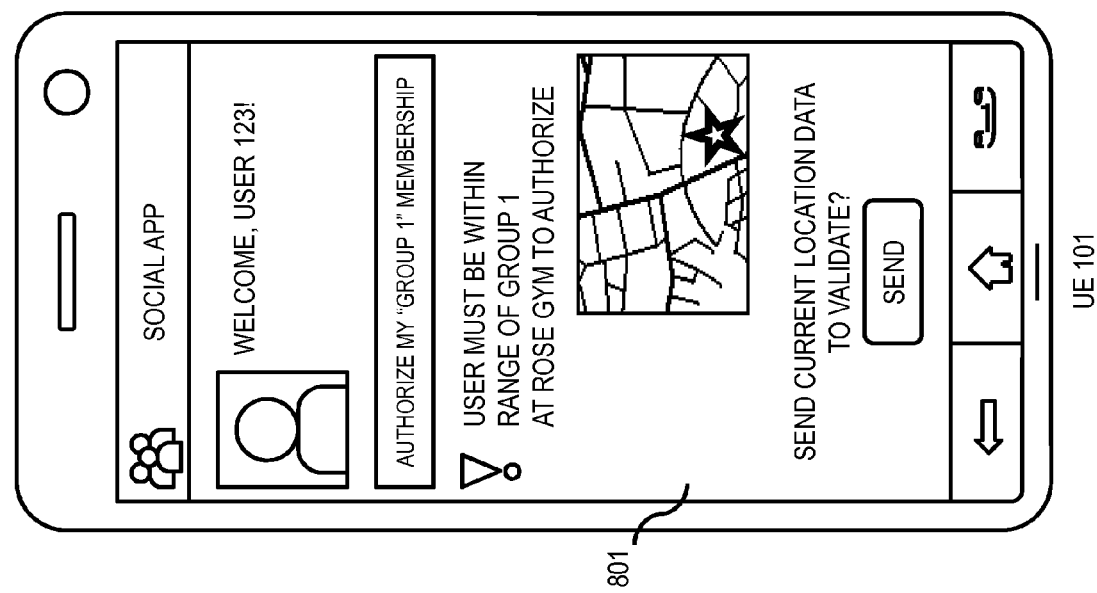
FIG. 8 is a diagram of user interface utilized in the processes of FIGS. 3-6, according to various embodiments.

FIG. 8 is a diagram of user interfaces utilized in the processes of FIGS. 3-6, according to various embodiments. In one scenario, an online group may have a mobile application available. Such application could be enhanced to have an "Authorize my group membership" function (user interface 801). This functionality would send the location of the mobile device to the application, which may validate that the user is within a predetermined radius of the group's location. If it is determined that the user is within this distance, the user is authorized and can immediately join the group.

FIG. 9 is a diagram of user interfaces utilized in the processes of FIGS. 3-6, according to various embodiments. In one scenario, the online group server may maintain a database of when each user was last authorized based on location (user interface 901). A server processor could check and send notifications to users every 'x' days/weeks that they need to re-verify their location (user interface 903). In accordance to the notification the user needs to re-verify, a process similar to the initial sign-up (user interface 905) by visiting the physical location again. This process makes it possible to keep the active members as a part of the online group. As discussed before, if a user group is meant only for the current students at a school, this process ensures that only the current students are part of the group.

Figure 10:
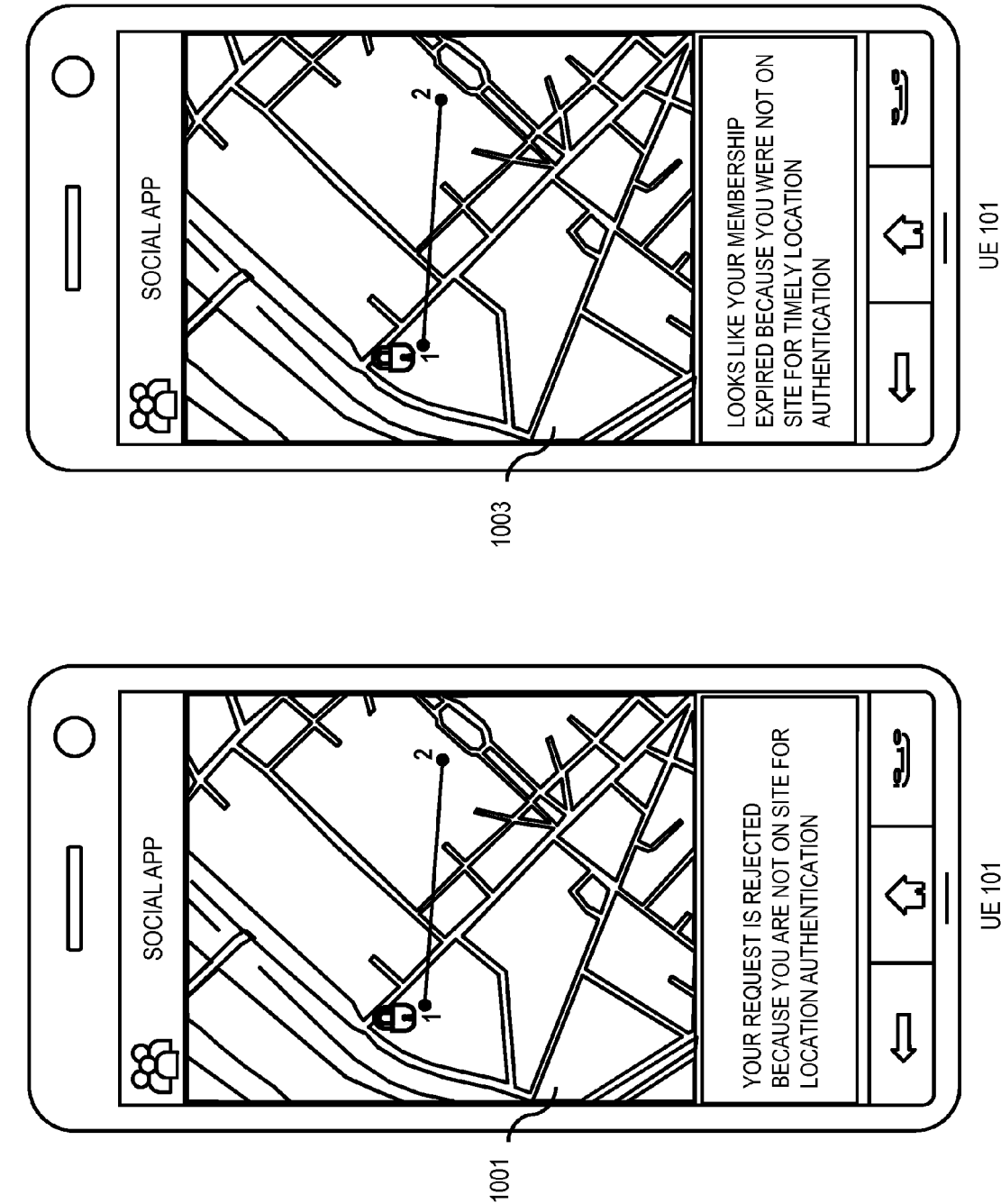
FIG. 10 is a diagram of user interface utilized in the processes of FIGS. 3-6, according to various embodiments.

FIG. 10 is a diagram of user interfaces utilized in the processes of FIGS. 3-6, according to various embodiments. In one scenario, the user who sends a request via UE 101 to access at least one online user group, needs to verify the location information, in case a user is unable to verify the location information during the authentication process, the point of interest platform 109 may cause a revocation of the access if the location information is not within the predetermined proximity of the at least one reference location (user interface 1001). In another scenario, a user who is already a member may need to re-verify the location information, such re-verification may be scheduled and/or on demand, and in case of any default on the part of the user, the membership of the user might be terminated (user interface 1003).

The processes described herein for determining location information associated with the at least one user and/or at least one device associated with the at least one user, and causing, at least in part, a granting of access to the at least one user group if the location information indicates that the at least one user is within a predetermined proximity of the at least one reference location may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
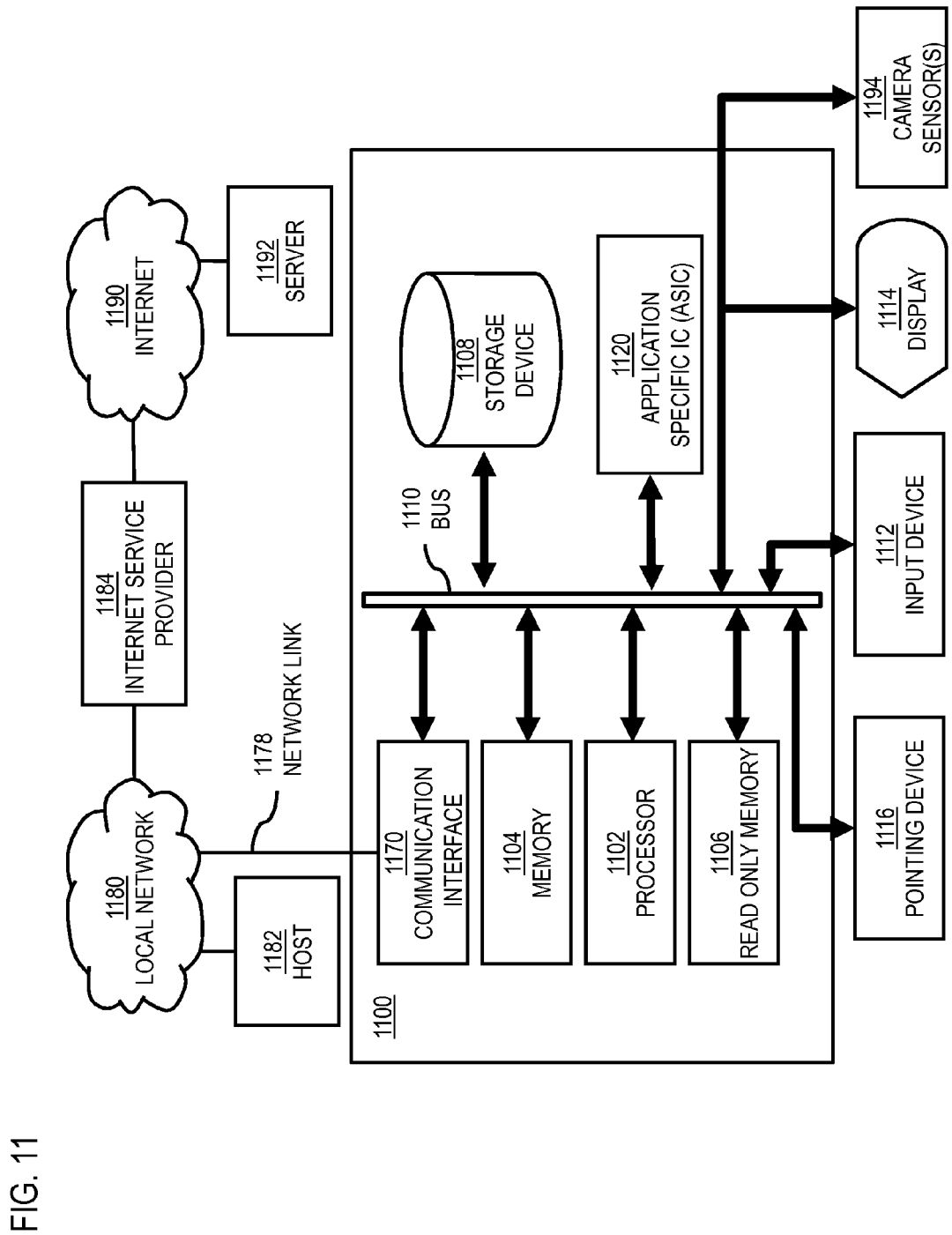
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to determine location information associated with the at least one user and/or at least one device associated with the at least one user, and causing, at least in part, a granting of access to the at least one user group if the location information indicates that the at least one user is within a predetermined proximity of the at least one reference location as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of determining location information associated with the at least one user and/or at least one device associated with the at least one user, and causing, at least in part, a granting of access to the at least one user group if the location information indicates that the at least one user is within a predetermined proximity of the at least one reference location.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to determining location information associated with the at least one user and/or at least one device associated with the at least one user, and causing, at least in part, a granting of access to the at least one user group if the location information indicates that the at least one user is within a predetermined proximity of the at least one reference location. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1100 also includes a memory 1104 coupled to bus 1110. The memory 1104, such as a random access memory (RAM) or any other dynamic storage device, stores information including processor instructions for determining location information associated with the at least one user and/or at least one device associated with the at least one user, and causing, at least in part, a granting of access to the at least one user group if the location information indicates that the at least one user is within a predetermined proximity of the at least one reference location. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for determining location information associated with the at least one user and/or at least one device associated with the at least one user, and causing, at least in part, a granting of access to the at least one user group if the location information indicates that the at least one user is within a predetermined proximity of the at least one reference location, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114, and one or more camera sensors 1194 for capturing, recording and causing to store one or more still and/or moving images (e.g., videos, movies, etc.) which also may comprise audio recordings. In some embodiments, for example, in embodiments in which the computer system 1100 performs all functions automatically without human input, one or more of external input device 1112, display device 1114 and pointing device 1116 may be omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 107 for determining location information associated with the at least one user and/or at least one device associated with the at least one user, and causing, at least in part, a granting of access to the at least one user group if the location information indicates that the at least one user is within a predetermined proximity of the at least one reference location to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to determine location information associated with the at least one user and/or at least one device associated with the at least one user, and causing, at least in part, a granting of access to the at least one user group if the location information indicates that the at least one user is within a predetermined proximity of the at least one reference location as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of determining location information associated with the at least one user and/or at least one device associated with the at least one user, and causing, at least in part, a granting of access to the at least one user group if the location information indicates that the at least one user is within a predetermined proximity of the at least one reference location.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to determine location information associated with the at least one user and/or at least one device associated with the at least one user, and causing, at least in part, a granting of access to the at least one user group if the location information indicates that the at least one user is within a predetermined proximity of the at least one reference location. The memory 1205 also stores the data associated with or generated by the execution of the inventive steps.

Figure 13:
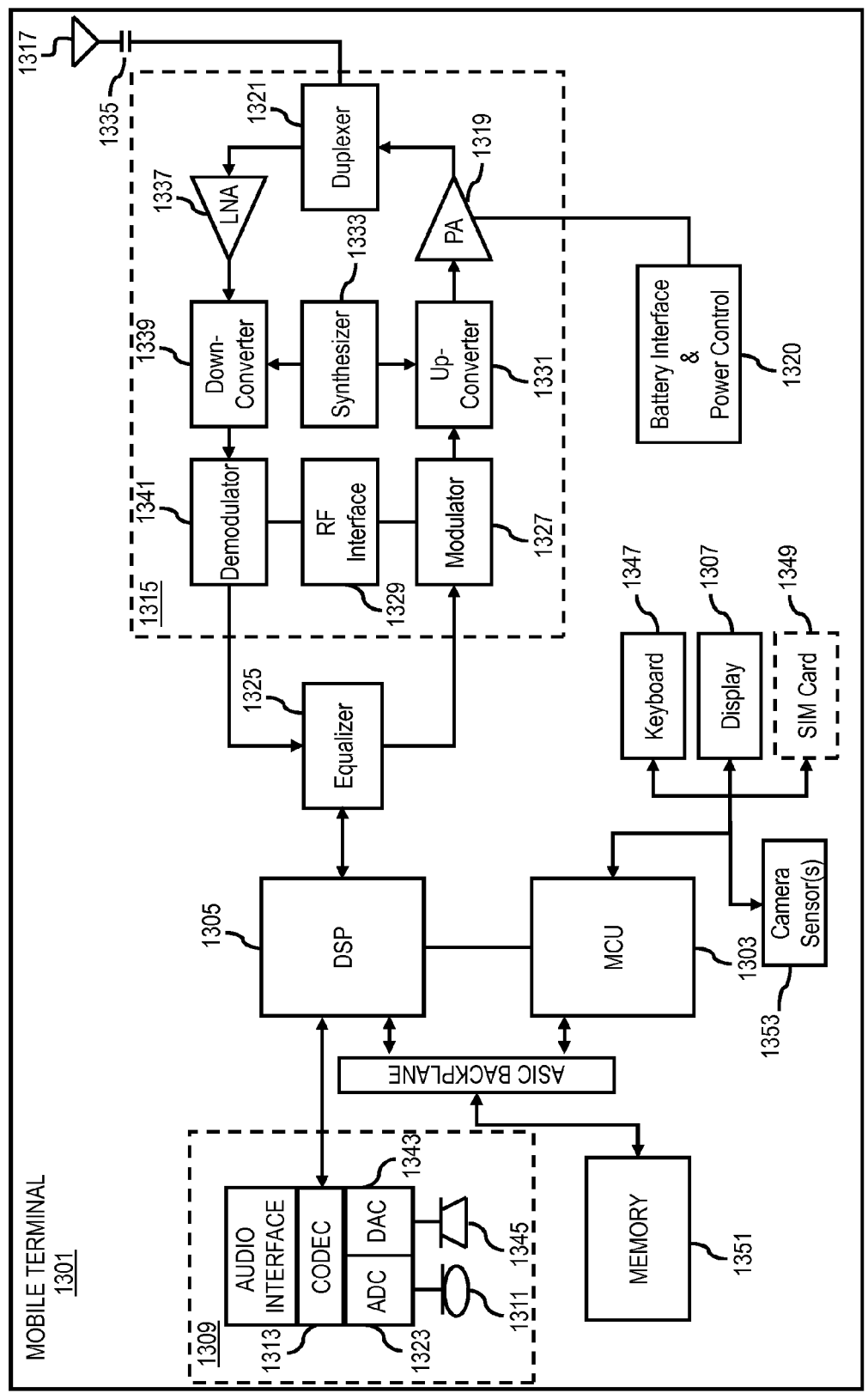
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of determining location information associated with the at least one user and/or at least one device associated with the at least one user, and causing, at least in part, a granting of access to the at least one user group if the location information indicates that the at least one user is within a predetermined proximity of the at least one reference location. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of determining location information associated with the at least one user and/or at least one device associated with the at least one user, and causing, at least in part, a granting of access to the at least one user group if the location information indicates that the at least one user is within a predetermined proximity of the at least one reference location. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to determine location information associated with the at least one user and/or at least one device associated with the at least one user, and causing, at least in part, a granting of access to the at least one user group if the location information indicates that the at least one user is within a predetermined proximity of the at least one reference location. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

Further, one or more camera sensors 1353 may be incorporated onto the mobile station 1301 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   at least one determination of a request from at least one user for an access to at least one user group, wherein the at least one user group is associated with at least one reference location, and wherein the reference location is a fixed location;
   at least one determination of location information associated with the at least one user, at least one device associated with the at least one user, or a combination thereof; and
   a granting of the access to the at least one user group if the location information indicates that the at least one user, at least one device associated with the at least one user, or a combination thereof is within a predetermined proximity of the at least one reference location.

2. A method of claim 1, wherein the (1) data and/or (2) information and/or (3) at least one signal are further based, at least in part, on the following:
   a monitoring of the location information continuously, periodically, according to a schedule, on demand, or a combination thereof; and
   at least one determination to maintain the access for the at least one user, at least one device associated with the at least one user, or a combination thereof, based, at least in part, on the monitoring.

3. A method of claim 2, wherein the (1) data and/or (2) information and/or (3) at least one signal are further based, at least in part, on the following:
   a transmission of at least one notification to the at least one user, the at least one device, or a combination thereof continuously, periodically, according to a schedule, on demand, or a combination thereof,
   wherein the at least one notification requests, at least in part, a re-verification of the location information, the re-verification including, at least in part, a revisiting of a location within the predetermined proximity of the at least one reference location.

4. A method of claim 1, wherein the (1) data and/or (2) information and/or (3) at least one signal are further based, at least in part, on the following:
   a monitoring of the location information continuously, periodically, according to a schedule, on demand, or a combination thereof; and
   at least one determination of the at least one device associated with the at least one user, or a combination thereof is within the predetermined proximity based, at least in part, on the monitoring.

5. A method of claim 1, wherein the (1) data and/or (2) information and/or (3) at least one signal are further based, at least in part, on the following:
   at least one determination of one or more authentication credentials associated with the at least one user, wherein the granting of the access is further based, at least in part, on the one or more authentication credentials.

6. A method of claim 5, wherein the one or more authentication credentials include, at least in part, a username, a password, a user certificate, a token, a web cookie, or a combination thereof.

7. A method of claim 1, wherein the (1) data and/or (2) information and/or (3) at least one signal are further based, at least in part, on the following:
- at least one determination of a duration that the at least one user, the at least one device, or a combination thereof is within the predetermined proximity of the at least one reference location,
- wherein the granting of the access is further based, at least in part, on the duration.

8. A method of claim 1, wherein the (1) data and/or (2) information and/or (3) at least one signal are further based, at least in part, on the following:
- an initiation of the request based, at least in part, determining that the user has requested a resource associated with the at least one user group,
- wherein the resource includes, at least in part, a website.

9. A method of claim 1, wherein at least one user group is associated with at least one client application, the method further comprising:
- causing, at least in part, a presentation of at least one option to generate the request in a user interface of the at least one client application.

10. A method of claim 1, wherein the (1) data and/or (2) information and/or (3) at least one signal are further based, at least in part, on the following:
- a revocation of the access if the location information is not within the predetermined proximity of the at least one reference location.

11. An apparatus comprising:
- at least one processor; and
- at least one memory including computer program code for one or more programs,
- the at least one memory and the computer program code configured to, with the at least one processor, cause the apparatus to perform at least the following,
  - determine a request from at least one user for an access to at least one user group, wherein the at least one user group is associated with at least one reference location, and wherein the reference location is a fixed location;
  - determine location information associated with the at least one user, at least one device associated with the at least one user, or a combination thereof; and
  - cause, at least in part, a granting of the access to the at least one user group if the location information indicates that the at least one user, at least one device associated with the at least one user, or a combination thereof is within a predetermined proximity of the at least one reference location.

12. An apparatus of claim 11, wherein the apparatus is further caused to:
- cause, at least in part, a monitoring of the location information continuously, periodically, according to a schedule, on demand, or a combination thereof; and
- determine to maintain the access for the at least one user, at least one device associated with the at least one user, or a combination thereof, based, at least in part, on the monitoring.

13. An apparatus of claim 12, wherein the apparatus is further caused to:
- cause, at least in part, a transmission of at least one notification to the at least one user, the at least one device, or a combination thereof continuously, periodically, according to a schedule, on demand, or a combination thereof,
- wherein the at least one notification requests, at least in part, a re-verification of the location information, the re-verification including, at least in part, a revisiting of a location within the predetermined proximity of the at least one reference location.

14. An apparatus of claim 11, wherein the apparatus is further caused to:
- cause, at least in part, a monitoring of the location information continuously, periodically, according to a schedule, on demand, or a combination thereof; and
- determine if the at least one user, the at least one device associated with the at least one user, or a combination thereof is within the predetermined proximity based, at least in part, on the monitoring.

15. An apparatus of claim 11, wherein the apparatus is further caused to:
- determine one or more authentication credentials associated with the at least one user,
- wherein the granting of the access is further based, at least in part, on the one or more authentication credentials.

16. An apparatus of claim 15, wherein the one or more authentication credentials include, at least in part, a username, a password, a user certificate, a token, a web cookie, or a combination thereof.

17. An apparatus of claim 11, wherein the apparatus is further caused to:
- determine a duration that the at least one user, the at least one device, or a combination thereof is within the predetermined proximity of the at least one reference location,
- wherein the granting of the access is further based, at least in part, on the duration.

18. An apparatus of claim 11, wherein the apparatus is further caused to:
- cause, at least in part, an initiation of the request based on, at least in part, determining that the user has requested a resource associated with the at least one user group,
- wherein the resource includes, at least in part, a website.

19. An apparatus of claim 11, wherein at least one user group is associated with at least one client application, wherein the apparatus is further casued to:
- cause, at least in part, a presentation of at least one option to generate the request in a user interface of the at least one client application.

20. An apparatus of claim 11, wherein the apparatus is further caused to:
- cause, at least in part, a revocation of the access if the location information is not within the predetermined proximity of the at least one reference location.

* * * * *